(12) United States Patent
Isham

(10) Patent No.: US 6,766,508 B1
(45) Date of Patent: Jul. 20, 2004

(54) OBJECT-ORIENTED SYSTEM HAVING ANONYMOUS SCHEDULER DESIGN PATTERN

(75) Inventor: Karl Michael Isham, Grantsville, UT (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/481,772

(22) Filed: Jan. 11, 2000

Related U.S. Application Data

(60) Provisional application No. 60/129,300, filed on Apr. 15, 1999.

(51) Int. Cl.[7] .............................. G06F 9/44; G06F 9/46; G06F 9/00
(52) U.S. Cl. ....................... 717/116; 717/104; 709/318; 709/106
(58) Field of Search .................. 717/102, 100–101, 717/103–105, 108, 116, 120, 124, 151; 345/746, 789, 811; 709/1, 100–107, 310, 315, 316, 318, 328, 418; 707/100, 10; 714/38; 710/15; 713/400; 705/1

(56) References Cited

U.S. PATENT DOCUMENTS

| | | | | |
|---|---|---|---|---|
| 4,323,966 A | * | 4/1982 | Whiteside et al. | 709/103 |
| 5,511,185 A | * | 4/1996 | Weinbaum et al. | 714/38 |
| 5,535,322 A | * | 7/1996 | Hecht | 705/1 |
| 5,548,756 A | * | 8/1996 | Tantry et al. | 707/10 |
| 5,640,546 A | * | 6/1997 | Gopinath et al. | 713/400 |
| 6,131,131 A | * | 10/2000 | Bassman et al. | 710/15 |
| 6,397,262 B1 | * | 5/2002 | Hayden et al. | 345/418 |
| 6,449,618 B1 | * | 9/2002 | Blott et al. | 707/100 |

* cited by examiner

*Primary Examiner*—Antony Nguyen-Ba

(57) ABSTRACT

A method and apparatus are disclosed for scheduling control inputs in an embedded real-time system through anonymous events. An object-oriented design pattern is provided that treats all events anonymously using an abstracted interface. Events are said to be anonymous since the details of each event are irrelevant, i.e., only the resource usage of the event is characterized and exposed. Deadlines and priorities are assigned to each event, as appropriate for the required quality of service (i.e., urgent events, routine events or deferred events). Response times for each event are appropriate to the quality of service associated with the event. Guaranteed response time determinism for time-critical events is implemented by re-clocking the event to a periodic time indication, such as a video synchronization signal delineating frames in a video feed. Events are validated against system resources at the time the events are submitted to the system to ensure that sufficient resources will exist when the event is to be executed, and if sufficient resources will exist, a commitment is provided.

20 Claims, 4 Drawing Sheets

# OBJECT-ORIENTED SYSTEM HAVING ANONYMOUS SCHEDULER DESIGN PATTERN

CROSS REFERENCE TO RELATED APPLICATIONS

This application claims the benefit of U.S. Provisional Application No. 60/129,300, filed Apr. 15, 1999.

FIELD OF THE INVENTION

The present invention relates to object-oriented programming techniques, and more particularly, to a method and apparatus for scheduling control input in an embedded real-time system using anonymous events.

BACKGROUND OF THE INVENTION

Object-oriented design is a design discipline that promotes good software design by providing tools that make it easy to create modules that are independent of one another. Dependencies between modules are minimized through the creation of interfaces that do not depend on specific implementations. Each object within an object-oriented system is defined by an interface and an implementation. Software clients external to the object depend completely on the object interface, and not the details of the object implementation. The implementation of an object contains the mechanisms and detail necessary to carry out the behavior of the object.

Object-oriented programs are collections of objects that relate to one another through these abstract interfaces. For a more detailed discussion of object-oriented designs, see, for example, Booch, Grady, Object-Oriented Analysis and Design with Applications (Benjamin Cummings, 1994); Martin, Robert C., Designing Object-Oriented C++ Applications Using the Booch Method, (Prentice Hall, 1995); Jacobson, Ivar, Object-Oriented Software Engineering, (Addison Wesley, 1992) or Rumbaugh, et. al., Object-Oriented Modeling and Design, (Prentice Hall, 1991), each incorporated by reference herein.

The collections of objects are themselves the subject of organization into modules that have a defined interface and embody some aspect of overall system behavior. Useful organizational patterns of these object collections have emerged as reusable solutions to specific problems in object-oriented design. Recognizing these common collaborations among objects can lead to the development of a system architecture that is smaller, simpler, and more understandable. These design patterns capture the structure of solutions that occur repeatedly in a particular design context.

Object-oriented patterns related to this invention include (i) the Command pattern described in Gamma, et. al., Design Patterns Elements of Reusable Object-Oriented Software, (Addison Wesley, 1994); (ii) the Pedestal and Reactor patterns described in Coplien & Schmidt, Editors. Pattern Languages of Program Design 1, (Addison Wesley, 1995); (iii) the Command Processor and Half Sync/Half Sync patterns described in Vlissides & Coplien & Kerth, Editors, Pattern Languages of Program Design 2, (Addison Wesley, 1996), and (iv) the Recursive Control pattern described in Martin & Riehle & Bushman, Editors, Pattern Languages of Program Design 3, (Addison Wesley, 1998). The discussions of each of these object-oriented patterns are incorporated by reference herein.

Object-oriented designs and design patterns are also applicable to real-time embedded systems. An embedded system is a computing solution developed for a specific real-world application, usually as a control mechanism for electronic equipment or devices. The term "real-time" implies that these systems have temporal requirements. Such systems are developed to satisfy the following three primary criteria: guaranteed timing deadlines, predictable response times, and stability in overload. A real-time system is said to be deterministic if it can guarantee the response time to control events. For a more detailed discussion of real-time design issues, see, for example, Klein et. al., A Practitioner's Handbook for Real-Time Analysis: Guide to Rate Monotonic Analysis for Real-time Systems, (Kluwer Academic Publishing, 1993), incorporated by reference herein.

Even within the possibilities granted by the above-described object-oriented designs and design patterns, it is still a common practice in embedded real-time systems to custom design an object model for each new set of requirements. Despite the apparent advantages, the reuse of object components in practice is minimal. This is due, in part, to the temptation of designers to treat each design uniquely. On the most basic level, most embedded real-time designs share a remarkably common set of requirements. Specifically, the system accepts a control input, processes the control input according to some established criteria (or control policy), and issues a set of commands to its associated hardware (through the hardware access layer, or drivers). While the control policy of a system and its hardware access layer may be arguably unique, the control input does not have to be.

There are three distinct quality of service (QoS) levels required in most multi-purpose embedded real-time systems. A quality of service is a means to classify response times for events. Automation of a system usually involves a control interface to an external computer. By necessity, this interface must guarantee a consistent and predictable level of performance and provide fast response times to meet the expectations given a machine-to-machine interface. Closely related to immediate automation commands is the desire to schedule events for execution at a specific time in the future. Such ability would be desirable, for example, if the event were either bound to an exact time, or multiple system components needed to execute events synchronously in order to conduct a facility-wide event.

These deferred events (i.e., events scheduled for execution at a specific future time) are usually issued through an automation interface, but stamped with a specific execution time. Although the use of automation to control embedded systems continues to increase, direct manual control will always be required. The quality of service demands of a human interface, however, differ significantly from the expectations of an automation interface. Where it is reasonable to expect the fastest response times from a machine, humans do not have such instant needs. Instead, response times must only be sufficient to give the human operator a perception of connection with the system by meeting human sensory perception deadlines.

Current systems rarely make distinctions for events based on these different levels of quality of service, opting instead for the simplicity of handling all events in the same way. This leads to several problems. When higher priority automation events are held off, waiting for system resources behind lower-priority manual events, a priority inversion occurs. Deferred events, when supported at all, are usually held in a container (or queue) until their execution time arrives, and then must contend for resources with other events at that time. Since there are no guarantees that system resources will be sufficient at the execution time for a given event, a delayed validation may occur. A delayed validation occurs when the system accepts an event for processing at a later time, but the event fails due to conditions present at the scheduled run-time.

Moreover, deterministic (guaranteed and predictable) response times, critical to the requirements of an automation interface, are usually handled by processing events as "fast as possible." The resulting worst-case performance is measured and automation events are specified with a hold-off time. Each new revision of the software must then be measured and hold-off times renegotiated with end users.

Currently, there is no design pattern that adequately addresses control input processing in current embedded systems design. Control input processing issues are usually tightly bound with the unique design of the control policy, making reuse impractical and performance tweaking a must. Thus, the control policy of the application is burdened with the responsibility of maintaining real-time design goals.

A need therefore exists for an object-oriented design pattern that addresses the above-described deficiencies in the current design of embedded real-time systems. A further need exists for an object-oriented class pattern that abstracts the control input scheduling in an embedded real-time system using anonymous events.

SUMMARY OF THE INVENTION

Generally, a method and apparatus are disclosed for scheduling control inputs in an embedded real-time system through anonymous events. An object-oriented design pattern is provided that treats all events anonymously using an abstracted interface. As used herein, events are said to be anonymous since the details of each event are irrelevant, i.e., only the resource usage of the event is characterized and exposed.

Deadlines and priorities are assigned to each event, as appropriate for the required quality of service. In an illustrative embodiment, the following three quality of service levels may be assigned to an event: (i) urgent (for automation events), (ii) routine (for manual events), or (iii) deferred (for time specific events). Response times for each event are appropriate to the quality of service associated with the event.

According to one aspect of the invention, deterministic processing is implemented by re-clocking the event to a periodic time indication, such as a video synchronization signal (video SYNC) delineating frames in a video feed. In this manner, guaranteed response time determinism is achieved by synchronizing events to a common time indication. According to another aspect of the invention, events are validated against system resources at the time the events are submitted to the system to ensure that sufficient resources exist for the later time when the event is to be executed. Thereafter, the present invention provides a commitment based on this validation.

A more complete understanding of the present invention, as well as further features and advantages of the present invention, will be obtained by reference to the following detailed description and drawings.

DETAILED DESCRIPTION

Figure 1:
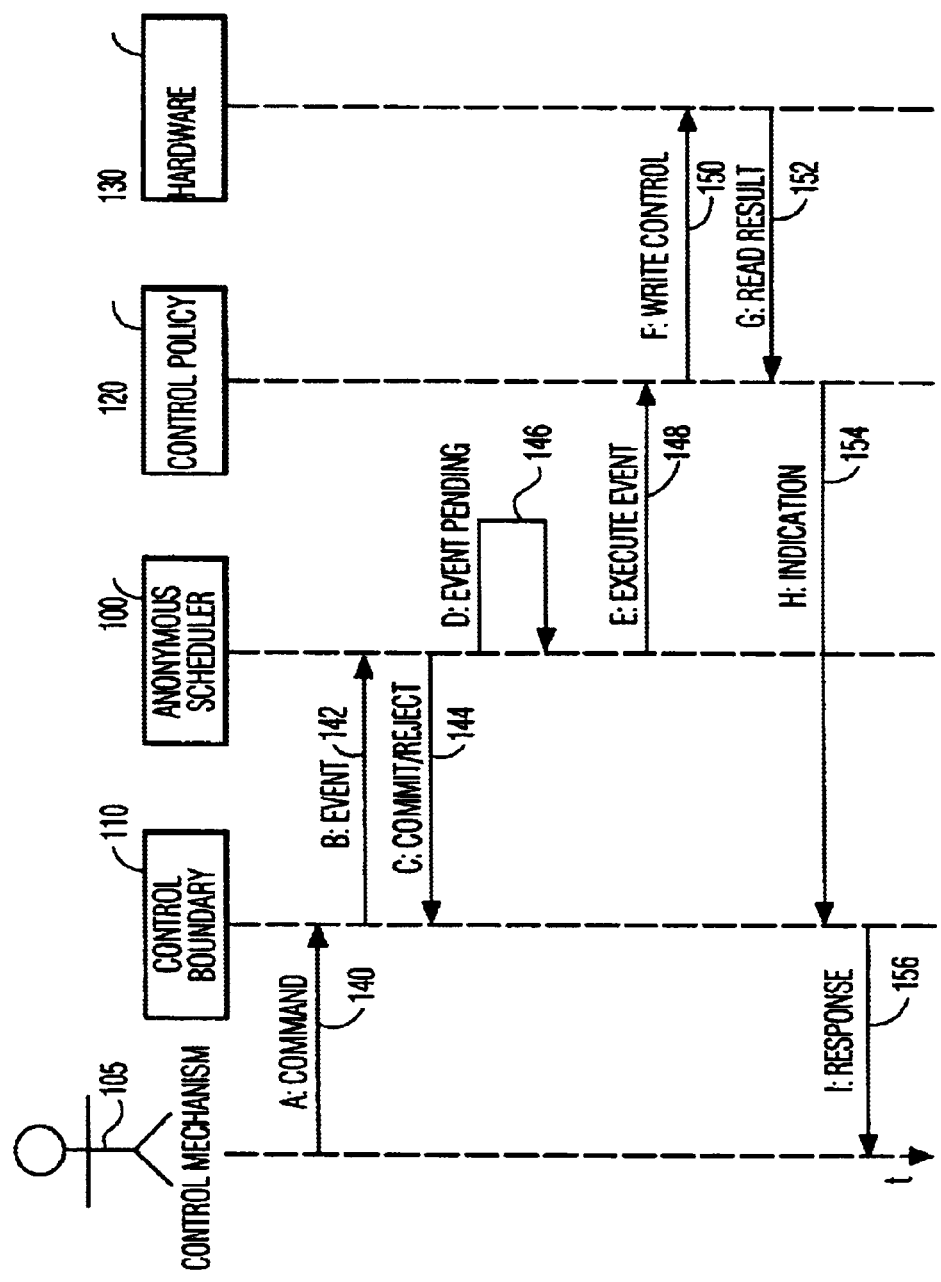
FIG. 1 is a unified modeling language (UML) sequence diagram illustrating an architectural view of the design pattern of the present invention.

FIG. 1 provides a unified modeling language (UML) sequence diagram illustrating an architectural view of the design pattern of the present invention. The present invention provides an object-oriented design pattern that addresses previous deficiencies in the current design of embedded real-time systems. In particular, an object-oriented class pattern is provided that abstracts the control input scheduling in an embedded real-time system through anonymous events. Thus, the present invention treats all events anonymously through an abstracted interface. As used herein, events are said to be anonymous since the details of each event are irrelevant. In other words, only the resource usage of the event is characterized and exposed.

In addition, the present invention assigns deadlines and priorities to each event, as appropriate for the associated quality of service level demanded by the control source. In the illustrative embodiment, the following three quality of service levels may be assigned to an event: (i) urgent (for automation events), (ii) routine (for manual events), or (iii) deferred (for time specific events). Routine events are not expected to meet hard deadlines. These are typically events performed in response to manual control inputs. Urgent events are time-critical and deterministic, the response typically given to automation control commands. Deferred events are time-stamped for execution at a specific time and date. Response times for each event are appropriate to the quality of service associated with the event. All three levels of quality of service found in embedded real-time systems are addressed by the design, removing priority inversion issues.

According to another aspect of the present invention, discussed further below in conjunction with FIG. 2, deterministic processing is implemented by re-clocking the event to a periodic time indication. In this manner, guaranteed response time determinism is achieved by synchronizing events to a common time indication (buffering events for a period of time, and then releasing the buffered events for execution at the appropriate time).

According to yet another aspect of the invention, events are validated against system resources at the time the events are submitted to the system to ensure that sufficient resources exist for the later time when the event is to be executed. Thus, since the availability of system resources is validated at the time the events are submitted to the system, the present invention replaces a conventional receipt-acknowledgement protocol with a commitment based on this validation. This commitment is based on a validation of system resources for each event, even if the event occurs much later.

Generally, the design pattern of the present invention adheres to the "open-closed" principle of object-oriented design. In other words, the architecture of the design pattern is open for additions (new events may be added), but closed to modification (the program elements of the design pattern do not need to change).

FIG. 1 provides a unified modeling language (UML) sequence diagram that illustrates an architectural view of how a typical embedded real-time system would employ the design pattern of the present invention. For a discussion of the UML notations used herein, see, for example, UML Notation Guide, version 1.1 (Sep. 1, 1997), downloadable from http://www.omg.org/docs/ad/97-08-05.pdf, and incorporated by reference herein. As shown in FIG. 1, a control boundary module 110 receives a command 140 from an external control mechanism 105, which may be, for example, a person.

As discussed further below in conjunction with FIG. 3, the control boundary 110 is responsible for decoding the command 140 and creating an event 142 to carry out the required action. It is noted that additional control parameters may be bound to the event 142, as required by the nature of the control command. The event 142 has an associated quality of service, which may include a specific execution time in the case of a deferred event. Again, the event 142 is validated by the anonymous scheduler 100 against system resources at the time the events are submitted to the system to ensure that sufficient resources exists for the later time when the event is to be executed. Following this validation, the anonymous scheduler 100 generates a commitment or rejection 144.

As previously indicated, an important element of the design pattern is the ability to achieve deterministic response times to critical events, which is accomplished by re-clocking incoming events to an external time base. Critical events are classified as having an urgent quality of service. Instead of executing events as fast as possible, the event is delayed until the next timing tick. The timing relationship among events is shown in FIG. 2. The duration of an individual timing tick, N, depends upon the needs of a given system, but is most likely a specific unit of time that is utilized and is available in the system. For example, a tick in the context of a video system would be a video frame. As shown in FIG. 2 and discussed further below, events are accumulated or buffered during a first time interval, N, and are thereafter released for execution at an appropriate subsequent time interval, such as interval N+1, prior to the corresponding deadline.

Figure 2:
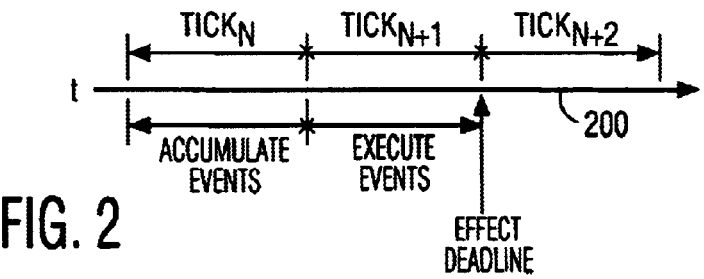
FIG. 2 illustrates the timing relationship of events re-clocked to a periodic time indication.

The re-clocking technique shown in FIG. 2 provides a deterministic response over a strictly fixed-time response, since the event measured with respect to the time reference always executes in period N+1, following its acceptance in period N. A strictly fixed-time response may execute either in period N or N+1, since the event is always added asynchronously with respect to the time reference. A fixed-time response may typically execute in period N if it was added early in the period, or in N+1 if it was added at the end of the period.

Thus, returning to FIG. 1, an event may be in an event pending state 146 until the corresponding appropriate execution time. Such a wait may be incurred by an urgent event, buffered until the next period, or by a deferred event before its scheduled execution time. Once the appropriate execution time occurs, the event is released for execution, and an execute event message 148 is provided to the control policy 120 which handles the event in a predefined manner in accordance with the underlying policy. Thus, a write control message 150 is provided to the system hardware 130 which generates a result 152. The control policy 120 then provides an indication 154 of the result to the control boundary 110, which in turn provides a response 156 to the control mechanism 105.

Figure 3:
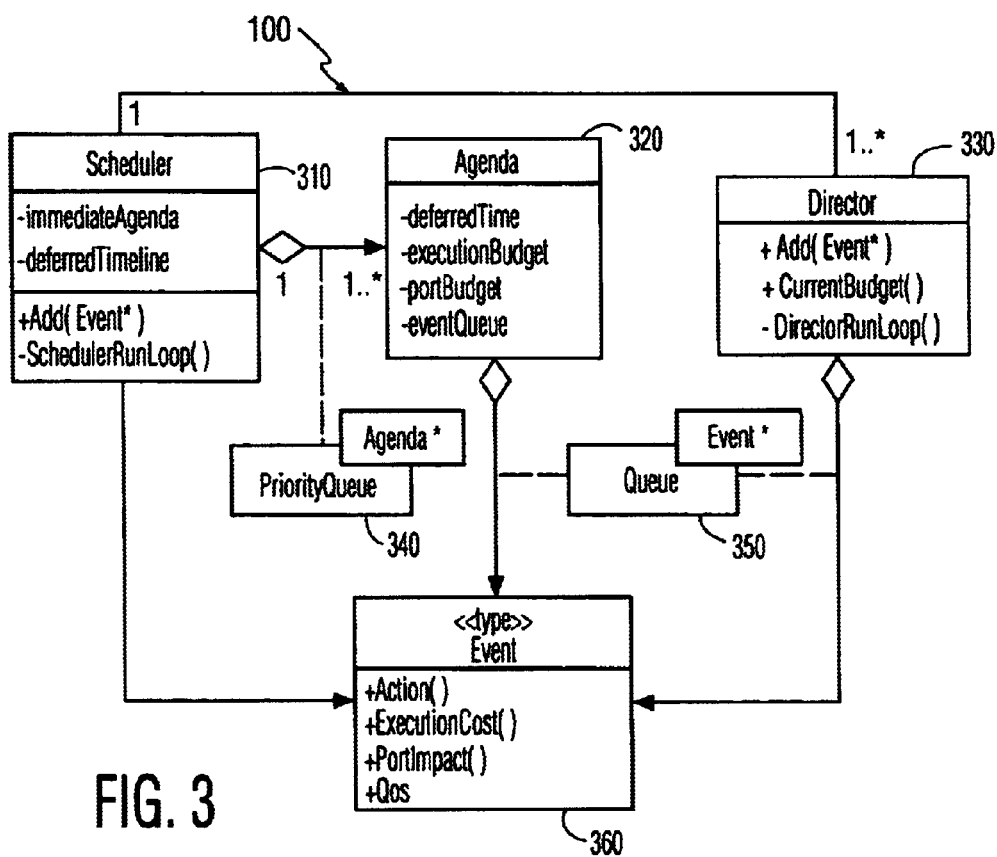
FIG. 3 illustrates a UML class diagram for the anonymous scheduler of the present invention.

FIG. 3 illustrates the UML class diagram for the anonymous scheduler 100 of the present invention. As shown in FIG. 3, the anonymous scheduler 100 of the present invention includes a scheduler participant 310 that (i) provides an interface for the input control modules 110 of the system, (ii) validates events to ensure that sufficient execution budget and hardware capacity exist, (iii) assigns the event for execution based on an associated quality of service, (iv) provides a commitment to the control mechanism 105 upon validation, and (v) manages a timeline of deferred events. As shown in FIG. 3, the scheduler participant 310 has two private data members (immediateAgenda and deferredTimeline). In addition, the scheduler participant 310 provides a public (visible) method (Add) and a private method (SchedulerRunLoop).

In addition, the anonymous scheduler 100 of the present invention includes an event participant 360 that specifies an interface for derived concrete events, and thus provides an abstract means to conduct an individual control action. A concrete event is defined with a specific action within a control policy, the required quality of service, and the impact on system resources.

As shown in FIG. 3, the event participant 360 provides four public methods (Action, ExecutionCost, PortImpact and QoS). Each concrete event derived from event 360 must be specified with two key indicators, execution cost and port impact, that each define the computing resources needed to perform the action associated with the event 360. Execution cost is the worst-case execution time of the action. Port impact is the degree to which the action consumes any control limits imposed by hardware. Control limits are usually specified per unit of time and are necessary to prevent overrunning the ability of the hardware to react to the resulting command. For example, a communications medium may be defined in terms of its message throughput, or an image processor may only be capable of performing an action once every video frame.

An agenda participant 320 is a repository of all events that must execute at a specific time. The agenda participant 320 contains the total resource utilization for a specific moment in time. As shown in FIG. 3, the agenda participant 320 provides four private methods (deferredTime, executionBudget, portBudget and eventQueue). A collection of agenda participants 320 is maintained in the data container priorityQueue participant 340. Thus, a priority queue participant 340 is a collection of deferred agendas 320 arranged in order by execution time.

In addition, a director participant 330 runs a collection of events 360 to be executed at a particular quality of service (QoS). Thus, a separate director participant 330 might be provided for urgent events, routine events and deferred events. In the illustrative embodiment, the urgent director participant 330 handles both urgent and deferred events (at the appropriate time). The director participant 330 provides two public methods (Add and CurrentBudget) and a private method (DirectorRunLoop). The director participant 330 maintains the running budget, CurrentBudget, for the remaining events 360. A queue participant 350 is a collection of events 360 arranged in first-in-first-out order.

Figure 4:
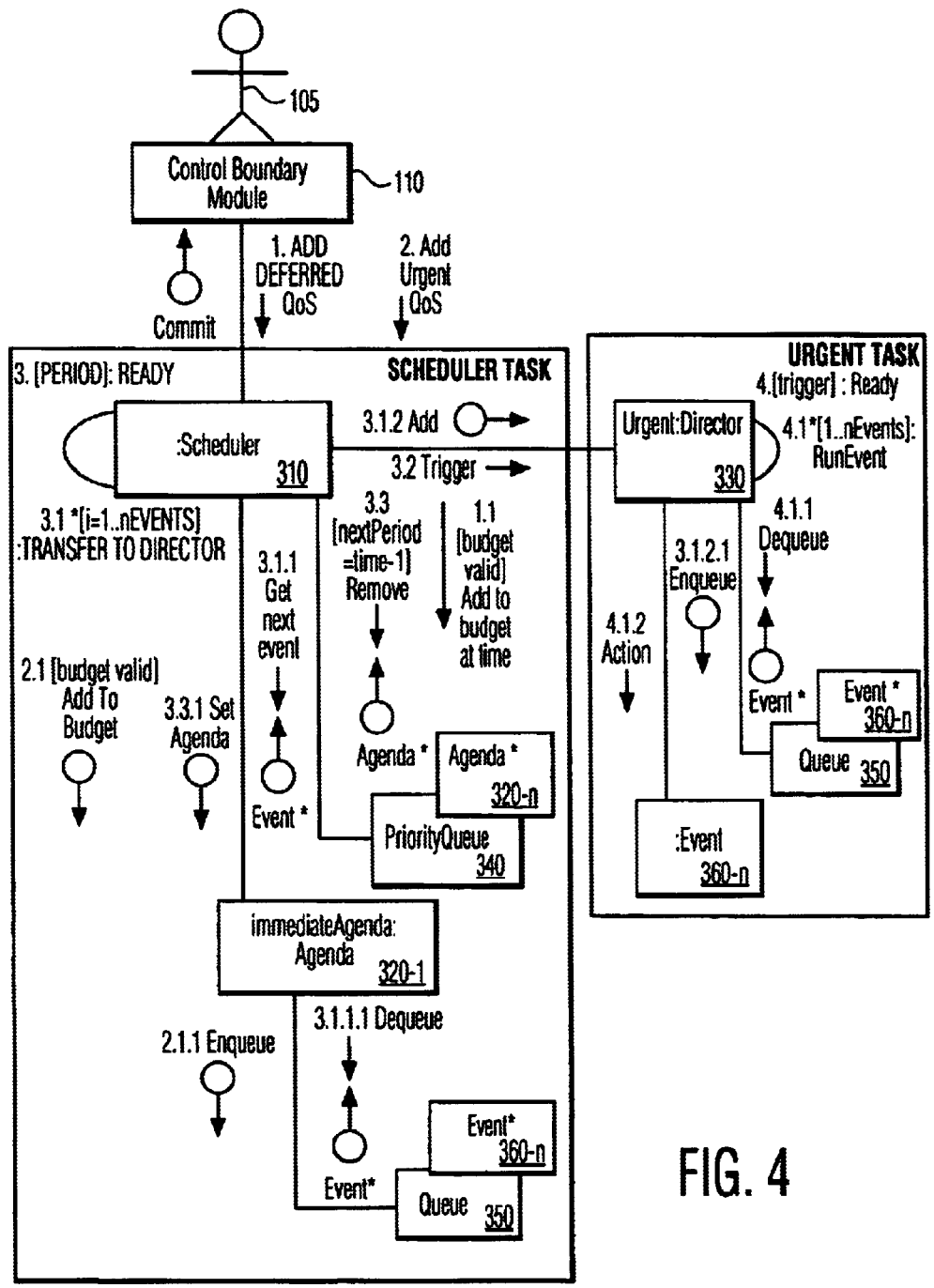
FIG. 4 provides a collaboration diagram showing urgent and deferred requests for the anonymous scheduler of the present invention.

FIG. 4 provides a collaboration diagram showing urgent and deferred requests for the anonymous scheduler of the present invention. As shown in FIG. 4, the control boundary module 110 receives commands from an external control mechanism 105. The control boundary modules 110 are responsible for decoding the command and creating an event. 360-n to carry out the required action. Additional control parameters may be bound to the event 360-n, as required by the nature of the control command. The event 360-n is also set to a specific quality of service (QoS), which may include a specific execution time in the case of a deferred event. The quality of service is often associated with the control mechanism itself. The event 360 is then submitted to the scheduler 310.

Concrete events are defined within the domain of the system control policy to carry out a specific action. Each event 360 is classified according to its quality of service (QoS), allowing the system to execute the event 360 with the appropriate priority. Thus, priority inversion, where a low priority event delays the execution of a time-critical event, is avoided.

As discussed hereinafter, FIG. 4 illustrates four different processing threads. A first processing thread (1) traces the processing of the addition of a new event with a deferred quality of service. A second processing thread (2) traces the processing of the addition of a new event with an urgent quality of service. A third processing thread (3) is initiated upon a predefined period. A fourth processing thread (4) is initiated upon a predefined trigger.

The first and second processing threads (1 and 2) trace the processing of the addition of a new event with a deferred or urgent quality of service, respectively. As previously indicated, when an event 360 is submitted to the scheduler 310, the execution time and port impact of the event 360 are validated to ensure a sufficient budget exists to accomplish the action, given its quality of service. Thus, as shown in FIG. 4, attempts to add an event are first processed by the scheduler 310. The total execution costs (executionBudget) for a specific deferred time index is maintained within an agenda 320. An immediate agenda 320-1 exists to coordinate events 360 for the next (most immediate) set of urgent actions to be executed.

Events 360 are valid if there is enough capacity remaining to add the event 360. Routine events (that are not expected to meet hard deadlines) may take many individual time units to complete, so new events 360 are compared directly against the total remaining items in the routine director 330. For each event 360, the scheduler 310 will identify the director 330 that will handle the event based on the quality of service associated with the event, and will then validate the execution budget accordingly. Events 360 that exceed the budget are deferred to a later execution time or rejected (depending on local policy).

"Assuming that a test 1.1 determines that sufficient execution budget is available, deferred events are stored in an appropriate agenda 320-n according to the scheduled execution time of the event 360. Likewise, assuming that a test 2.1 determines that sufficient execution budget is available, urgent events that are added to the scheduler 310 over a given period of time are stored in an immediate agenda 320-1 until the next execution period arrives. A message is returned to the control boundary 110 to indicate the success of adding the event to the schedule."

The third processing thread (3) is initiated upon a predefined period. This period is synchronous with the periodic time indication illustrated in FIG. 2. Each tick denotes the start of a period. At the beginning of this period, a loop is initiated at thread 3.1 for all accumulated events 360-n to obtain the events (3.1.1), remove the events from the queue (3.1.1.1) and add the events (3.1.2) to the urgent director 330 for execution at high priority. The scheduler 310 will trigger processing of the urgent director 330 at thread 3.2.

The scheduler 310 also manages the deferred agenda 320 timeline. After the scheduler 310 has loaded the urgent director 330 with all its events for the current period, the scheduler 310 checks for the next deferred execution time at thread 3.3. If a time exists in the timeline that will be due following the next urgent period, then it is removed from the timeline and replaces the immediate agenda 320-1 (thread 3.3.1). In this way, the budget for deferred events is assured, and incoming urgent events are validated against this pre-allocated budget. Additionally, these deferred events are executed with critical timing requirements at the exact time they were scheduled.

Each director 330 instance is associated with a specific quality of service, where urgent-deferred events are run with an urgent quality of service at high priority, as described above, and routine events are run with a routine quality of service at a lower priority. As shown in FIG. 4, the director 330 performs a test at thread 4 to detect a trigger of the next execution time. Upon detecting the trigger, a loop is initiated at thread 4.1 for each queued event to run the event. Thus, the event 360 is removed from the queue during thread 4.1.1 and the appropriate action is performed during thread 4.1.2.

Figure 5:
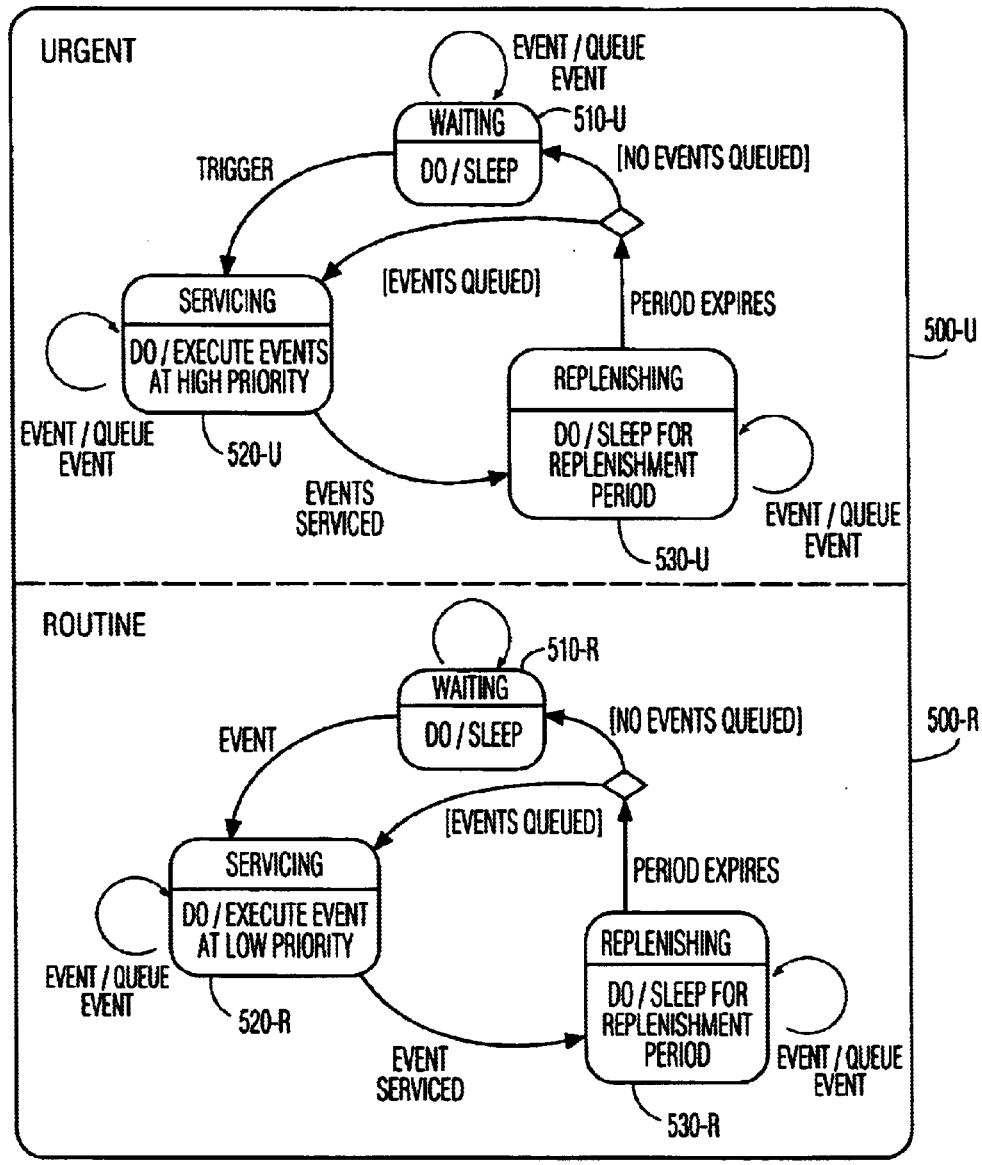
FIG. 5 illustrates an urgent and routine sporadic server state diagram for urgent and routine directors of FIG. 3.

FIG. 5 illustrates an urgent and routine sporadic server state diagram 500-U and 500-R, respectively. As shown in FIG. 5, the director 330 gets events 360 from its queue, and calls its Action( ). Each director 330 has three states: wait, service and replenish. If no events are queued, the director 330 will enter the wait state 510 until the occurrence of a predefined event (a trigger for an urgent director and an event in the case of a routine director). It is noted that for an urgent director 330-u, urgent events are accumulated during one period and released for execution during the following period, as indicated by the "event/queue event" transition notation for wait state 510-u. It is further noted that the "event/queue event" transition in FIG. 5 corresponds to thread 2.1 in FIG. 4, and the trigger transition from wait state 510-u in FIG. 5 corresponds to the "3.2 Trigger" message in FIG. 4.

Once the predefined event has occured, or if there are events queued, the director 330 will enter the servicing state 520 to perform the event(s) with the appropriate priority level. Once the event is serviced, the director 330 will enter the replenish state 530, and again sleep for a predefined interval.

The number of actors dequeued in each run period is determined by the execution budget of the server. Each of these servers is designed to meet the requirements imposed by Rate Monotonic Analysis (RMA) to ensure they meet critical timing deadlines.

It is to be understood that the embodiments and variations shown and described herein are merely illustrative of the principles of this invention and that various modifications may be implemented by those skilled in the art without departing from the scope and spirit of the invention.

What is claimed is:

1. A method for interfacing to a system having at least one control input, said method comprising the steps of:

determining at least one event associated with said control input;

subsequent to determining at least one event associated with said control input, dynamically defining a resource usage for each of said events; and subsequent to determining at least one event associated with said control input, dynamically scheduling a performance of said events based on said resource usage and a required quality of service using an object oriented class pattern.

2. The method according to claim 1, further comprising the step of validating said events to ensure that sufficient resources exist for a scheduled execution time.

3. The method according to claim 1, further comprising step of providing a commitment to perform said event if sufficient resources exist to perform said event prior to a deadline.

4. The method according to claim 1, further comprising the step of managing a timeline of deferred events.

5. A method for scheduling a control input, said method comprising the steps of:
   determining at least one event associated with said control input;
   subsequent to determining at least one event associated with said control input, dynamically establishing a deadline and priority for each of said events based on a required quality of service; and
   subsequent to determining at least one event associated with said control input, dynamically scheduling a performance of said events based on said deadline and priority using an object oriented class pattern.

6. The method according to claim 5, further comprising the step of validating said events to ensure that sufficient resources exist for a scheduled execution time.

7. The method according to claim 5, further comprising the step of providing a commitment to perform said event if sufficient resources exist to perform said event prior to a deadline.

8. The method according to claim 5, further comprising the step of managing a timeline of deferred events.

9. A method for scheduling a control input, said method comprising the steps of:
   determining one or more asynchronous time-critical events associated with said control input;
   synchronizing said one or more asynchronous time-critical events to a common time reference having a predefined period; and
   establishing a deadline for each of said asynchronous time-critical events that is deterministic with respect to said common time reference.

10. The method of claim 9, wherein each event is delayed until a start of a period in said time reference.

11. The method of claim 9, further comprising the step of accumulating events received in a given period in said time reference at least until a start of a next period.

12. The method of claim 9, further comprising the step of releasing accumulated events for execution at an indicated period in said time reference prior to said corresponding deadline.

13. A method for scheduling a control input, said method comprising the steps of:
   determining at least one event associated with said control input;
   subsequent to determining at least one event associated with said control input, dynamically establishing a deadline for each of said events based on a required quality of service;
   subsequent to determining at least one event associated with said control input, dynamically determining if sufficient resources exist to perform said event prior to said deadline; and
   subsequent to determining at least one event associated with said control input, dynamically providing a commitment to perform said event if sufficient resources exist to perform said event prior to said deadline.

14. The method according to claim 13, further comprising the step of managing a timeline of deferred events.

15. The method according to claim 13, wherein said step of determining if sufficient resources exist includes the step of evaluating an execution budget and a hardware capacity.

16. The method according to claim 13, wherein said step of determining if sufficient resources exist confirms the capacity to perform said event prior to said deadline, given an associated quality of service.

17. A system for interfacing to a system having at least one control input, said system comprising:
   a memory for storing computer readable code; and
   a processor operatively coupled to said memory, said processor configured to:
      determine at least one event associated with said control input;
      subsequent to determining at least one event associated with said control input, dynamically define a resource usage for each of said events; and
      subsequent to determining at least one event associated with said control input, dynamically schedule a performance of said events based on said resource usage and a required quality of service using an object oriented class pattern.

18. A system for scheduling a control input, said system comprising:
   a memory for storing computer readable code; and
   a processor operatively coupled to said memory, said processor configured to:
      determine at least one event associated with said control input;
      subsequent to determining at least one event associated with said control input, dynamically establish a deadline and priority for each of said events based on a required quality of service; and
      subsequent to determining at least one event associated with said control input, dynamically schedule a performance of said events based on said deadline and priority using an object oriented class pattern.

19. A system for scheduling a control input, said system comprising:
   a memory for storing computer readable code; and
   a processor operatively coupled to said memory, said processor configured to:
      determine one or more asynchronous time-critical events associated with said control input;
      synchronize said one or more asynchronous time-critical events to a common time reference having a predefined period; and
      establish a deadline for each of said asynchronous time-critical events that is deterministic with respect to said common time reference.

20. A system for scheduling a control input, said system comprising:
   a memory for storing computer readable code; and
   a processor operatively coupled to said memory, said processor configured to:
      determine at least one event associated with said control input;
      subsequent to determining at least one event associated with said control input, dynamically establish a deadline for each of said events based on a required quality of service;
      subsequent to determining at least one event associated with said control input, dynamically determine if sufficient resources exist to perform said event prior to said deadline; and
      subsequent to determining at least one event associated with said control input, dynamically provide a commitment to perform said event if sufficient resources exist to perform said event prior to said deadline.

* * * * *